Aug. 12, 1969     R. A. RAMEY, JR     3,460,929

METHOD AND APPARATUS FOR THE MANUFACTURE OF GLASS ENVELOPES

Filed Dec. 14, 1966     4 Sheets-Sheet 1

FIG.I.

WITNESSES
Theodore F. Wrobel
James F. Young

INVENTOR
Robert A. Ramey
BY Charles F. Renz
ATTORNEY 3,460,929
METHOD AND APPARATUS FOR THE MANUFACTURE OF GLASS ENVELOPES
Robert A. Ramey, Jr., Gainesville, Fla., assignor to Westinghouse Electric Corporation, Pittsburgh, Pa., a corporation of Pennsylvania
Filed Dec. 14, 1966, Ser. No. 601,705
Int. Cl. C03b 15/08, 9/04
U.S. Cl. 65—67                              3 Claims

ABSTRACT OF THE DISCLOSURE

An apparatus and method for manufacture of glass envelopes in which molten glass is floated on liquid bath and the floating glass is formed into an envelope.

---

This invention relates to the manufacture of glass articles by floating glass on a liquid bath and more particularly to methods and apparatus for forming the floating glass into formed glass articles.

One particular application of this invention is in the manufacture of glass envelopes for cathode ray tubes. The cathode ray tube envelope normally consists of a face panel portion which includes a viewing window with perpendicular side walls or flanges extending from the viewing portion. The edges of these flanges are normally sealed to the enlarged opening of a conical section with a neck portion secured to the smaller opening of the conical portion. The normal procedure of the prior art was to fabricate the face panel by molding glass to the desired shape. The conical portion and neck portion was normally formed by spinning. These sections were then assembled together to form the envelope. The prior art technique requires a substantial amount of equipment. This invention is directed to a process that is economical and particularly with low volume.

It is accordingly an object of this invention to provide an improved method of fabricating formed glass articles.

It is another object to provide an improved method of forming glass objects in which curved and flared portions are provided of substantially uniform and controllable thicknesses throughout.

It is still a further object to provide a method for fabricating an envelope for a cathode ray tube in which the viewing portion and conical section is formed in one operation.

Briefly, the present invention accomplishes the above cited objects by floating a layer of glass on a hot dense bath and raising a mold from the bath. The glass in response to the partial vacuum created by lifting of certain portions of the glass will be caused to conform to the mold which includes an inturned region.

These and other objects and advantages of the present invention will become more apparent when considered in view of the following detailed description and drawings, in which.

Figure 1:
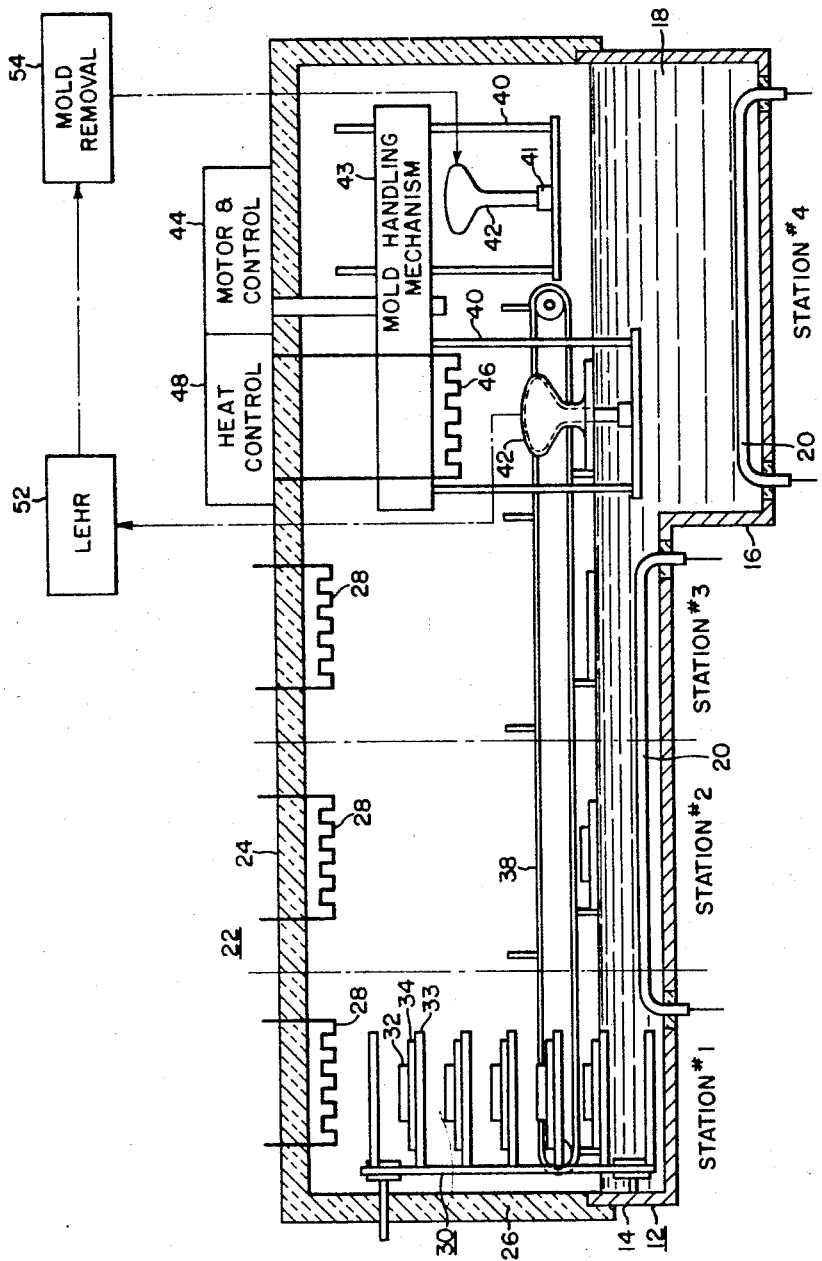
FIGURE 1 is a diagrammatic sectional view of an apparatus for producing a glass envelope according to this invention.
Figure 2:
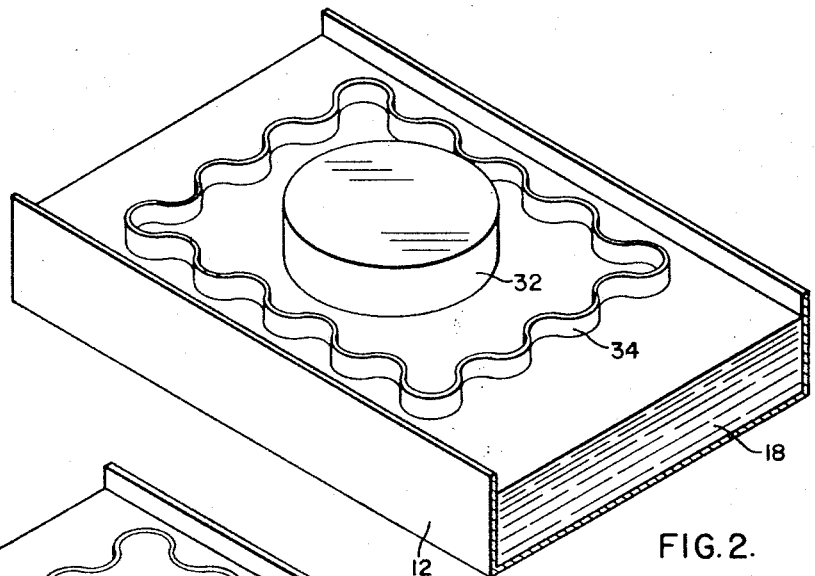
FIG. 2 is a perspective view of a portion of station 2 shown in FIG. 1.

Referring first to the apparatus shown in FIG. 1, there is illustrated a suitable apparatus for heating and molding of glass sheets into envelopes in accordance with the invention. The continuous apparatus illustrated in FIG. 1 includes a tank 12 of suitable material such as graphite having side walls 14 and a bottom wall 16. The tank 12 contains a bath 18 of a suitable dense liquid material such as tin. A plurality of submerged heaters 20 are provided within the bath 18 for raising of the temperature of the bath to a suitable temperature. Suitable heating means may also be provided on the exterior of the tank 12. The tank 12 is provided with a covering member 22 which includes a top wall 24 and side walls 26. The side walls 26 of the cover 22 engage the side walls 14 of the tank and the seal therebetween may be suitable to maintain a differential in pressure between the enclosure formed by the tank 12 and the cover 22 and the atmosphere without. Suitable heating means illustrated as heater 28 are provided in the upper portion of the cover 26 as indicated in the drawings at stations 1, 2 and 3 for controlling of heat within these stations. A continuous conveyor arrangement 30 located at the station 1 region permits the loading of glass sheets or blanks 32 into the apparatus 10 and the lowering of these glass sheets 32 within suitable framing members 34 into the liquid bath 18. After the lowering of the glass sheets 32 onto the bath 18, the glass sheets 32 with associated frame member 34 proceed from station 1 to the right and are moved by a suitable continuous conveyance system 38. A perspective view of the glass sheet 32 within the liquid bath 18 is illustrated in FIG. 2 and corresponds to the operation within station 1 and at least a portion of sation 2. Within stations 2 and 3, the glass is heated to a molten temperature and flows to fill the frame 34. The glass plate 32 is then moved into station 4 of the equipment illustrated in FIG. 1 wherein the molding and forming operations are performed. Station 4 includes one of the heating elements 20 which controls the temperature of the bath 18 at station 4.

Figure 4:
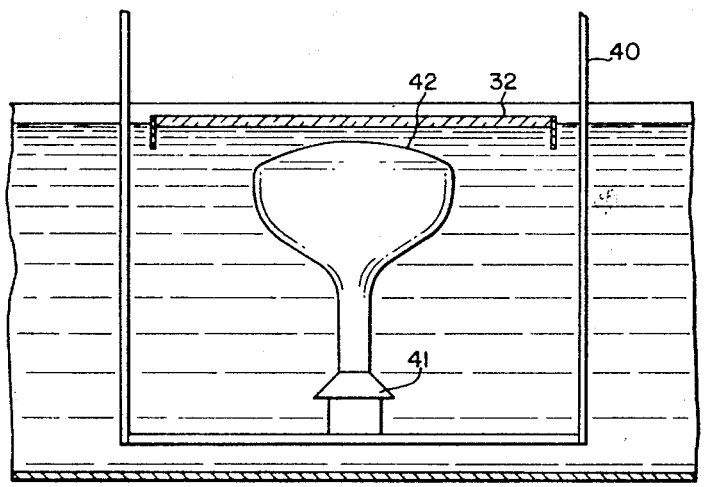
FIG. 4 through FIG. 8 are sectional views showing the various steps at station 4 of FIG. 1.
Figure 5:
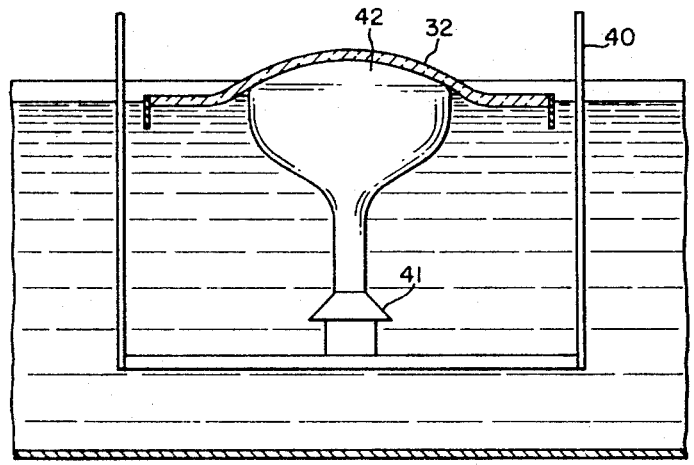
Figure 6:
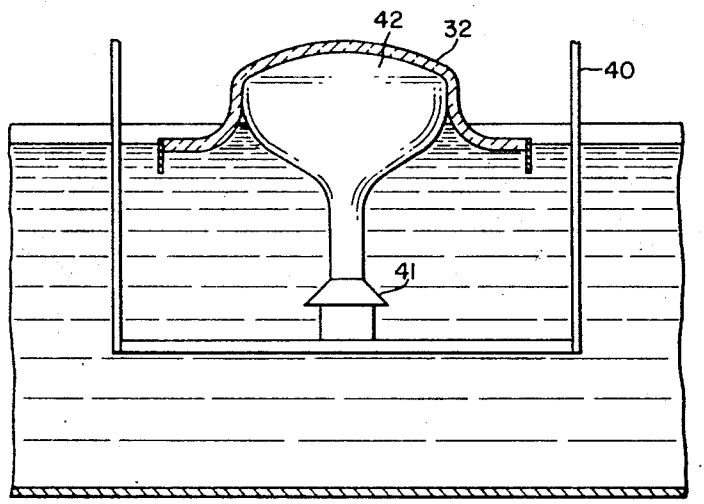
Figure 7:
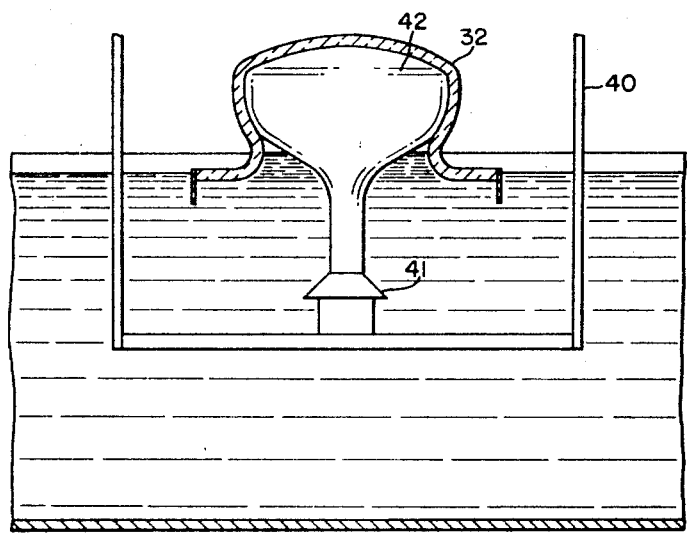
Figure 8:
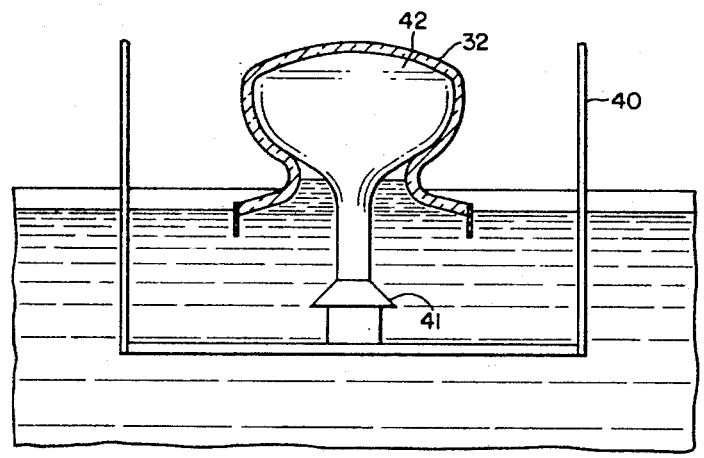
Figure 9:
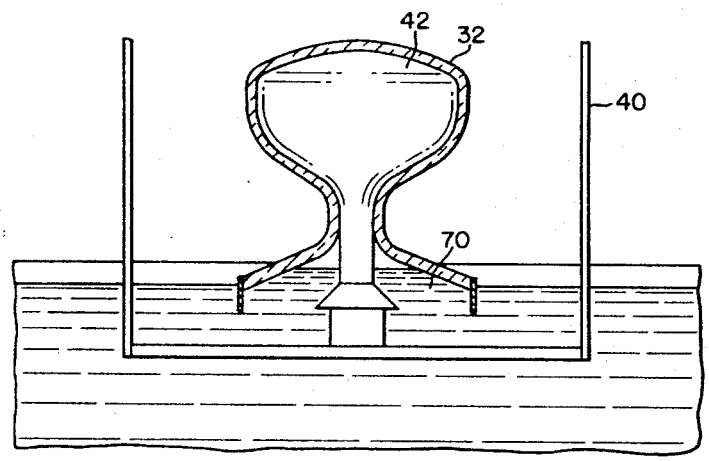
FIG. 9 illustrates the final step in mold removal.
Figure 10:
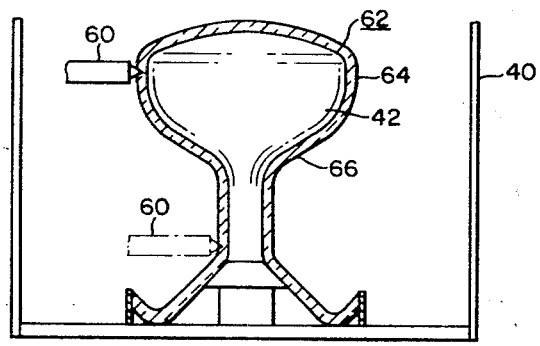

A mold platform 40 with a mold 42 is submerged beneath the surface of the bath and the glass plate 32 moves into position above the mold member 42. This is illustrated in FIG. 4. The platform 40 and associated mold 42 are moved upwardly as illustrated in the FIGS. 5, 6, 7, 8 and 9 by means of a motor control 44. In addition, a heating element 46 is provided at station 4 and above the surface of the glass member 32 for control of the temperature of the glass by means of a heat control 48. The mold platform 40 by suitable rotating or other mechanical means, after raising the mold above the surface of the bath 18, is removed from the tank and goes into a lehr oven 52. The glass covered mold then moves from the lehr oven to a mold removal station 54 as illustrated in FIG. 10 wherein suitable cutting members 60 score the glass envelope 62. The mold 42 is then allowed to cool and the glass envelope 62 may be broken along the scored portions and removed. The glass envelope 62 is removed from the mold member 42 and consists of a face plate portion 64 and a funnel portion 66. The mold 42 may then be moved, cleaned and then reinserted into the platform member 40. The mold 42 is then rotated into the apparatus 10 and submerged within the bath 18 and again goes through the above series of operations.

In carrying out the method of the invention, the glass sheet 32 may be of a suitable composition such as Glass Code 9019 which is a high strain non-browning glass supplied by Corning Glass Works. The glass sheet 32 may be produced by dropping gobs of glass onto a flat surface and then pressing flat in the shape of a pancake as illustrated in FIG. 2. Once the sheets 32 are solidified, they are visually examined for entrapped gas bubbles and defects. The glass sheet may then be given a suitable anneal prior to insertion into the apparatus 10.

Figure 3:
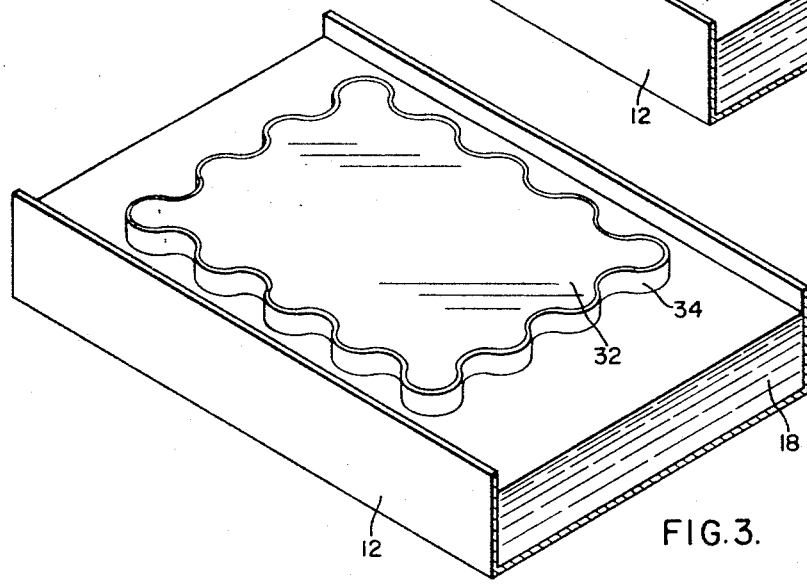
FIG. 3 is a similar perspective view of a portion of station 3 shown in FIG. 1.

On the insertion of the glass plate 32 into the apparatus 10, the glass plate 32 and the deformable frame 34 are positioned on a platform member 33 which is secured to a movable conveyor system 30 for rotating a plurality of the platform members 33 as illustrated in FIG. 1. The glass sheet 32 on insertion into the apparatus 32 is then lowered for the bath 18. During this time the glass sheet 32 is heated above the annealing temperature to a temperature of about 800° F. prior to insertion into the bath 18. The glass sheet 32 then enters the bath 18 and floats on the surface as illustrated in station 2 of FIG. 1 and as illustrated in FIG. 2. The temperature of the bath 18 is about 1200° F. at station 1 and the glass is now allowed to melt and fill the frame 34 as illustrated in FIG. 3. The heating elements 28 located above the bath may also include gas flames which may be directed onto the top surface of the glass plate 32 to achieve flame finish. The lower surface of the glass plate 32 will be of course flattened by the contact with the bath 18. The glass filled frame 34 is transported along the canal or channel from station 1 through stations 2 and 3 to station 4 by means of a suitable conveyor system 38 illustrated as a continuous belt with suitable extensions provided thereon for engaging the frames 34 and moving them along a canal.

On arrival of the glass sheet 32 at station 4, the glass sheet is stabilized to the temperature at which the viscosity is found suitable for the operations hereinafter described. The specific temperatures are determined for each glass type and the dynamic rates required in the manufacturing process. With the specific type glass described above, the temperature should be about 1350° F. and the glass will run only very slowly under forces caused by its own weight. The temperature of bath is about 1350° F. at station 4.

The mold 42 having an outer surface shaped like the inside of the cathode ray tube is positioned below the surface of the bath 18 and below the temperature stabilized glass filled frames as illustrated in FIG. 4. As illustrated, the mold 42 is secured within a sleeve member 41 on the platform 40. The mold member 42 may be removed from the sleeve member 41 in later operations if so desired. It is obvious that the size of frame 34 and the thickness of the glass sheet 32 must be determined in order to match the requirements of the predetermined cathode ray tube being manufactured. A suitable material for the mold is graphite.

The mold 42 is raised from the metal bath 18 by means of the platform member 40 associated with the mold handling mechanism 43 and motor control 44. This mechanism controls not only the upward movement of the platform 40 but also the rotation of the platform 40 for removal of the glass covered mold 42 and the insertion of the uncovered mold 42 for repeated operations. The heating member 46 with its associated heat control 48 also provides means for controlling the temperature during the molding operation. The mold 42 is now raised from the liquid bath as illustrated in FIGS. 4 through 9. As the mold 42 engages the glass sheet 32, the glass is forced to flow toward the conformation to the shape of the mold 42 by the force of the atmosphere within the apparatus enclosure minus the pressure under the lower surface of the glass sheet 32. From a consideration of FIG. 9, one can calculate force applied to the glass sheet 32. It will be uniquely the weight of the raised column of the bath 18. This is particularly obvious when one considers the pressure of some gas entrapped above the bath 18. This gas would obviously be at a pressure below atmosphere by the weight of the raised metal column 70. In the case of tin, this is a negative pressure of about one pound per square inch for each three inches of height and this would be the pressure on the glass sheet 32 driving it toward conformation to the mold 42. The force of drawing glass from the molten glass sheet 32 in the frame 34 is a function of the horizontal components of this pressure and would vary from the gas pressure at tangency to the mold to zero at the level of the main pool of the bath 18, see FIG. 7. These are substantial forces when a dense metal is used as the bath 18. They can be orders of magnitude larger than the weight of the glass being moved.

In order to enhance the control over the glass thickness and the ease of mold removal, the rate of withdrawal of the mold 42 may be programmed by well known techniques. The deformable glass filled frame 34 may be operating in a regular or distorted iris to cause selected glass build-up or reduce such build-up as the mold is raised. It is also possible to provide a controlled amount of gas or other material about the bath 18 and below the glass to either control pressure, provide release agent or some other beneficial purpose. It would occupy some or all of the spaced referred to as in entrapped gas in FIG. 9. The temperature control of the region above the mold 42 will be such as to help prevent the glass from excessive slumping under the force of its own weight. The mold 42 may be hollow and preferably of a material with a higher coefficient of expansion than glass. A predetermined negative pressure could be maintained within a hollow mold until the glass is hardened. Removal of the vacuum in cooling will tend to cause the mold to become smaller around and longer than the glass bulb interior tending to lift the face plate. Some further positive pressures should further enhance mold removal when the face plate is cracked off.

The glass covered mold 42 with its associated platform and waste glass is now completely removed from the metal bath as indicated in FIG. 10 and is moved to a suitable lehr oven for proper cooling temperatures. The glass covered mold 42 may then be moved to the mold removal operation wherein circular marking or scoring at the dash lines indicated in FIG. 10 is provided. The glass covered mold 42 is then allowed to cool and then may be cracked and broken along the score lines. If the score is deep enough the separation is automatic otherwise sudden localized application of heating or cooling can be utilized for this operation. The following steps for the removal of the mold 42 and reassembly of the bulb 62 may be in the following manner. The funnel portion 66 of the envelope 62 is grasped in a split chuck and the face plate 64 is lifted with a vacuum cup or head mounted in a chuck coaxial and splined to a split chuck. The mold 42 may then be prepared for reinsertion into the apparatus 10. The face plate 64 may then be lowered onto the funnel 66 and resealed by a process well known in the industry and the spline assures accurate reseating of the face plate 64 to the funnel 66. The sealing of the face plate 64 to the funnel 66 may be made with suitable glass frit as is well known in the industry. The envelope 62 may then be removed and annealed and the completed envelope is ready for utilization and incorporation of components as is well known in the art.

What is claimed is:

1. Apparatus for manufacturing a glass envelope comprising a dense molten bath means on which a glass sheet of material is supported and means for maintaining said glass at a molding temperature, a molding member movable from within said molten bath to engage the lower surface of said glass sheet causing said glass sheet to flow and conform to said molding member, wherein the pressure differential between the upper surface of said glass sheet and the lower surface of said glass sheet causes said glass sheet to conform to said molding member.

2. The method of fabricating a glass envelope comprising the following steps: supporting a glass sheet on the surface of a liquid bath of dense material, heating said glass sheet to a molding temperature, positioning a mold member beneath the surface of said bath and raising said mold member into contact with the lower surface of said glass sheet, maintaining the temperature of said glass sheet above the deformation temperature while continuing the upward movement of said mold member and wherein the pressure differential between the upper surface of said glass sheet and the lower surface of said glass sheet causes said glass sheet to conform to the outer surface of said mold member to form said envelope.

3. The method of claim 2 which includes cooling said mold member and envelope after removal from said bath, scoring said envelope and breaking apart along said score to allow removal of said envelope in sections from said mold member and then reassembling said sections to form said envelope.

References Cited
UNITED STATES PATENTS

| | | | |
|---|---|---|---|
| 694,685 | 3/1902 | Sievert | 65—67 |
| 2,699,014 | 1/1955 | Van Steenis | 65—107 |

S. LEON BASHORE, Primary Examiner

JOHN H. HARMON, Assistant Examiner

U.S. Cl. X.R.

65—182